United States Patent Office 3,429,515
Patented Feb. 25, 1969

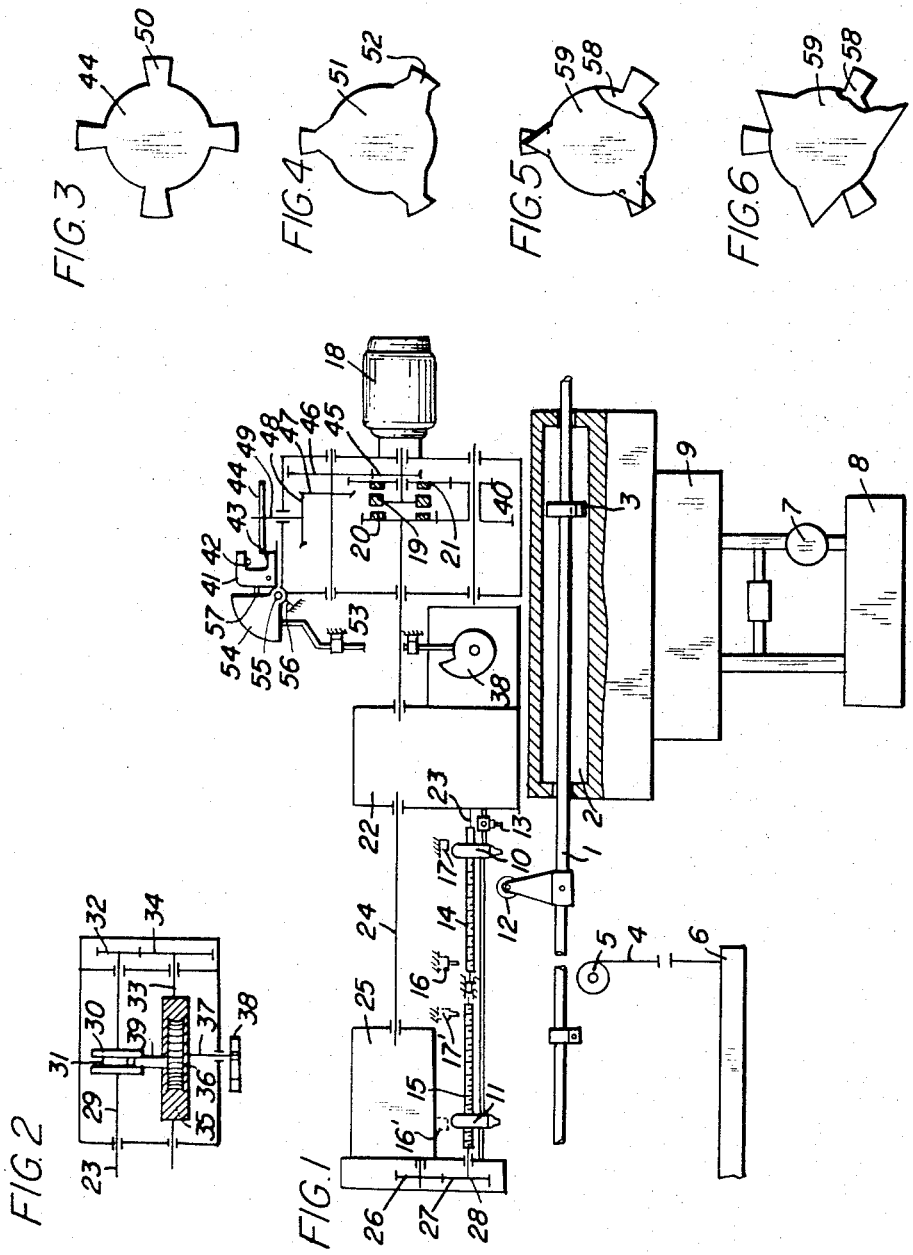

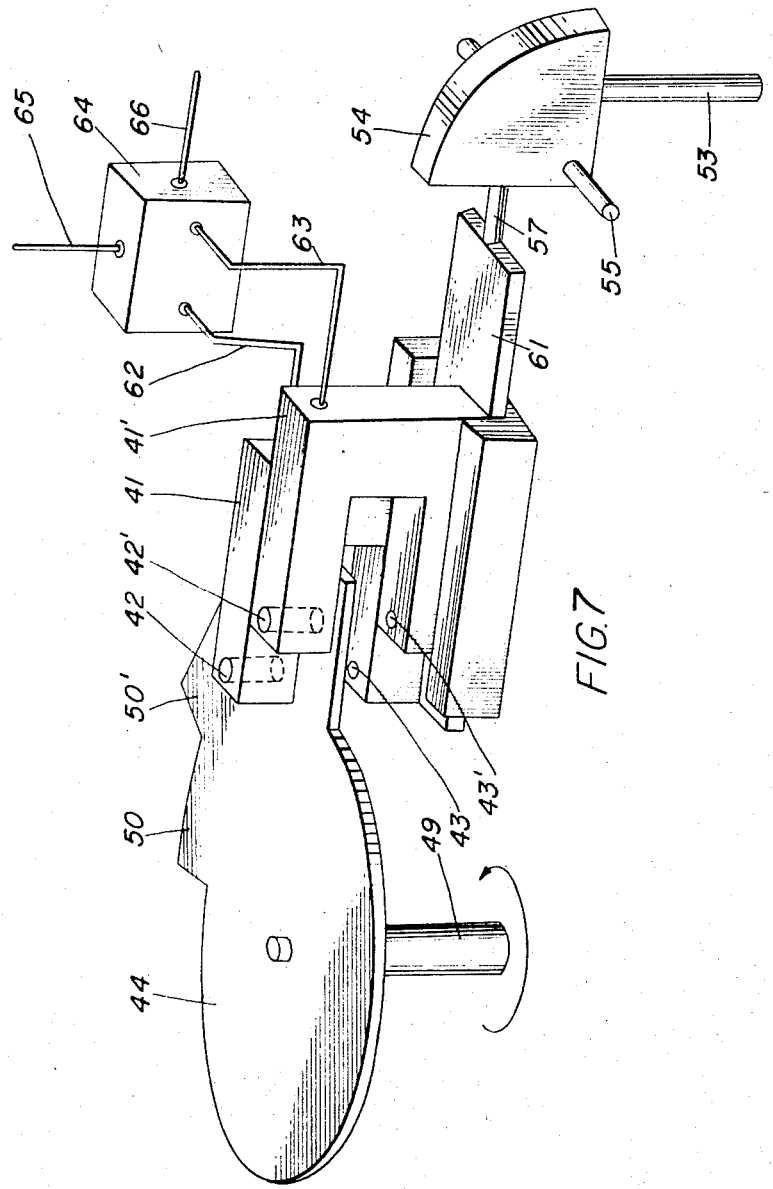

3,429,515
CONTROL AND SWITCHING DEVICE IN MECHANICALLY OR HYDRAULICALLY OPERATED TRAVERSE-MOTION SYSTEMS IN SPINNING, SPOOLING AND ESPECIALLY RING TWIST MACHINES
Carsten Ramcke, Wuppertal-Ronsdorf, Germany, assignor to Barmer Maschinenfabrik A.G., Wuppertal-Oberbarmen, Germany
Filed Mar. 16, 1965, Ser. No. 440,269
Claims priority, application Germany, Mar. 18, 1964, B 75,948
U.S. Cl. 242—26.3      7 Claims
Int. Cl. B65h 54/00, 81/00

ABSTRACT OF THE DISCLOSURE

A device for controlling the movement of limit switches on traverse mechanisms that are used in producing windings in the textile industry. The drive of the threaded spindles is controlled through the use of two or more impulse-producing means. A switching disc or discs having tongues or the like for interrupting a light beam striking a photoelectric cell is employed to control the movement of the limit switches. The use of two or more impulse-producing means makes it possible to carry out a variety of speed changes of the limit switch movements and a wide variety of distribution possibilities in the winding buildup.

---

The present invention relates to a control and switching device for mechanically or hydraulically driven traverse systems in spinning, spooling and especially ring twist machines having two end switches that are displaceable in stages in accordance with a predetermined program. More particularly, the subject invention is directed to systems in which the drive of the displacing members of the end switches is controlled by a photoelectric or electromagnetic impulse giver and by revolving switching disc which interrupts the light beam and/or alters the induced magnetic flux of the impulse-producing device.

In my copending application Ser. No. 374,109 which was filed on June 10, 1964, I described a control device of the subject type. The disclosure of the said copending application is incorporated in the present application.

As is described in my copending application, the photoelectric or electromagnetic impulse-producers and the rotating switching plate are settable with respect to each other in their position or they are adjustable according to the program. Additionally, the width of the switching tongues or switching windows can differ depending upon the distance from the axis of rotation of the plate. In particular, the tongues or windows can be designed in the form of a particular curve. Finally, the switching plate may consist of two or more partial discs provided with switching tongues which are turnable and securable with respect to each other.

The present application has as its principal object the development of a still further improved control and switching device of the type disclosed in the above identified copending application.

In general, it is proposed in accordance with the subject development that the control and switching device be provided with two or more impulse-producing means. The impulse-producing means may be of the same or of a different type. In a preferred embodiment each impulse-producing means is allocated its own switching disc. The impulse-producers may lie at different distances from the common axis of the rotating disc or discs. Likewise, they may be mounted at a distance from one another and at the same distance from the disc rotation axis. Further, the impulse-producing means may be arranged adjustably parallel or tangentially to the switching disc circumference. Insofar as the impulse-producing means lie at a differing distance from the common disc rotation axis, it is essential that at any given time it be possible to engage only one of the impulse-givers for the delivery of switching impulses. There, provision must be made that the particular impulse-producing means that is engaged is arranged so as to be disengageable by means of special control switches and simultaneously that another impulse-producing means be engageable.

In this manner it is possible to undertake all conceivable varieties of speed change of the end switch displacement movements and any desired distribution in the winding build-up. As an example, in the case of successive sections of stroke diminution and stroke enlargement, it is possible to set the speed of stroke diminution at a different rate from that of the stroke enlargement.

The drawing includes FIGS. 1–6 of my copending application Ser. No. 374,109 which was filed on June 10, 1964. The drawing also includes FIG. 7 which illustrates the improved device covered in the present application.

FIG. 1 schematically shows a control and switching device according to the invention with a hydraulically driven traverse mechanism;

FIG. 2 schematically shows a special additional gear for the adjusting or displacing system; and FIGS. 3 to 6 schematically set forth examples of switching discs of the adjusting system;

FIG. 7 is a schematic representation of the improvement specifically claimed in the present application.

In a ring twist machine the raising and lowering of the ring or spindle bank necessary for the building up of a winding of known winding type takes place by means of the traverse mechanism which transmits its program controlled reciprocating movement over connecting members to the bench to be moved. In the example of execution represented, the hydraulically driven traverse mechanism is shown as including piston rod 1 which, in a known manner, is pressed to the right or to the left by means of working piston 3 conducted in cylinder 2 of the hydraulic reversing gear, for which purpose on cylinder 2 a corresponding control line system for the pressure fluid is connected. To piston rod 1 there is attached the end of a draw band 4 which, conducted over one or more deflection rollers 5, carries the ring or spindle bench 6 suspended at its other end. The pump 7, the pressure fluid container 8 and the hydraulic devices and lines grouped in the casing 9 (shown closed) are of conventional arrangement and construction.

The hydraulic forces necessary for the raising and lowering of the ring bench are generated by pump 7 and are transmitted by means of the pressure fluid, the working piston 3, the piston rod 1 and the draw band 4, to the ring bench. The settable or adjustable hydraulic devices and lines housed in the casing 9 determine—for example, by controlled opening and closing of the safety valve between oil pressure and oil return-flow conduit or by controlled quantity regulators installed in the return conduits for both cylinder chambers, with nonreturn valves switched parallel to them—the stroke speed and, excited by corresponding switching commands of limit switches 10 and 11, also the stroke direction reversal of the ring or spindle bench 6.

The limit switches 10 and 11 are, in turn, operated by the switch-feeler mounted in fixed position on piston rod 1. At the end of a winding process, the switch-feeler 12 may also act on disengaging switch 13, if in the last lowering stroke according to program of the ring bench 6 the limit switch 10 has been, according to program, rendered inoperative.

Displacing members 14 and 15 constructed as threaded spindles move end switches 10 and 11 along a switching path on which blocking switches 16 and 17 and 16' and 17' adjustable in their position are arranged in at a distance apart according to the desired winding form and length. Before the start of the winding operation it is possible on the electrical control part of the apparatus, by means of a selector switch, for the control program corresponding to the desired winding type to be set, so that the blocking switches 16 and 17 and 16' and 17' operated by the limit switches 10 and 11 shifted during the winding process excite relays switches and relays in the electrical control part which, in turn, switch over the hydraulic switching members housed in the casing 9 and also the electric switching elements, for example, switching couplings, in the drive of the threaded spindles 14 and 15, and, respectively, the turning direction of the motor 18 according to the shifting program selected.

The two individually turnable threaded spindles 14 and 15 are driven in common by motor 18 reversible in its turning direction and running continuously during the entire winding operation. Its turning drive takes place according to the invention over an electromagnetically switchable double coupling 19, 20, 21, whose one switching coupling 19, 21 makes possible the switching on of a transmission countershaft 40 onto the drive shaft common to the two threaded spindles and, further, over a reducing or step-up gear 22, from which there branch both a shaft 23 as extension of the threaded spindle 14 and also a shaft 24 which, in turn, over the reversing gear 25, the alternating wheels 26 and 27 and the extension 28, drives the threaded spindle 15. The alternating wheels 26 and 27 may possibly also be replaced by a stageless controllable gear. The reversing gear 25 makes it possible to change the turning direction of the threaded spindle 15 so that threaded spindles 14 and 15 can be switched to turn in the same or in opposite directions. The electromagnetically shiftable double coupling forming the reversing gear 25 in the present example, but not separately represented, is brought into a constant position (for the length of the whole winding process) according to the winding program selected, by a corresponding setting of the selector switch on the electrical control part of the apparatus to the selected winding program. The possibility of changing the two gear wheels 26 and 27 for gear wheels of another reduction (transmission) ratio or the use of a stageless regulatable or adjustable gear means, in cooperation with the reversing gear 25, that the two limit switches 10 and 11, corresponding to each direction change of motor 18, can be driven either with threaded spindles 14 and 15 switched to turn in the same direction, with increasing or decreasing or constant distance apart, simultaneously from right to left or from left to right, or with threaded spindles 14 and 15 switched to turn oppositely, with differing or the same movement dimensions toward or away from each other. The speed at which the limit switches 10 and 11 are moved in the operation determines the particular slope angle of the winding body. It is also entirely possible to shut off completely the drive for the one or the other threaded spindle and thereby to let the limit switch concerned remain unmovable, so that on this machine it is also possible to wind so-called bottle spools.

The axial displacement of the two threaded spindles 14 and 15 during the winding process, by which the especially flat accommodation of the winding body gradient to the surface of the spool shell is achieved takes place by means of a special additional gear connected to gear 22, which additional gear is driven by shaft 23. On the right hand extension 29 (FIG. 2) of shaft 23 there is affixed a disc 30 with a circumferential groove 31. The gear wheel 32 firmly seated on the extension 29 is in engagement with the gear wheel 34 mounted on shaft 33. The worm 35 mounted on shaft 33 drives, over worm wheel 36, the shaft 37 and the cam plate 38 affixed to this. The worm wheel 36 carries on its end surface facing disc 30 an eccentrically mounted follower (carrier) pin 39, which projects into the circumferential groove 31 of disc 30. The distance of the follower pin 39 from the pivot axis of the worm wheel 36 is adjustable. In consequence of this eccentricity, on turning of the worm wheel 36, the shaft extension 29, the shaft 23 and thereby also the threaded spindles firmly connected with each other, not to be sure unturnably, but axially, are moved back and forth in their longitudinal direction. The speed of the reciprocating movement of the disc 30 and thereby of the spindles in a complete rotation of the worm wheel 36 is not uniform, but corresponds to that of a crank drive, in which the speed at the stroke reversal points is equal to zero and reaches its maximum about in the middle of the stroke. This unevenly accelerated or retarded axial movement of the threaded spindles 14 and 15 is superimposed on the uniform movement of the limit switches 10 and 11 coming from the turning of the threaded spindles and produces movement of limit switches 10 and 11 resulting from these two speeds. Through corresponding choice of the transmission ratio of the alternating wheels 32 and 34, the reciprocating movement of the threaded spindles can be adapted to the movements of the limit switches 10 and 11 from the spindle turning as desired. In particular, the superimpositions can be adjusted in such a way that the maximum movement develops on the path ends of limit switches 10 and 11, that is, when the switches 10 and 11 approach their blocking switches 16 and 17 and 16' and 17', respectively, so that thereby slender winding transitions can be achieved in the initial stage and final stage of the winding process. If, in the case of certain winding types, the additional axial movement of the threaded spindles is undesirable, then they can be switched out by sliding the follower pin 39 into the pivot point of the gear wheel and fixing it there. This special gear may, however, also be arranged to be disengageable from gear 22 as a whole, or be provided drivable by itself and be equipped with an engageable drive of its own in order, for example, to be put out of operation during certain periods of the winding operation. The switching coupling 19, 20, which transmits the rotary movements of motor 18 to the drive shaft of gear 22 without interposition of the transmission countershaft 40, and the switching coupling 19, 21, which makes possible the engagement of the countershaft 40 are operated according to the selected winding program by an impulse-producer. The engaging of the coupling is executed there, however, always for only a short time and at brief intervals, whereby a theoretically discontinuous, that is, stagewise displacement of the limit switches 10 and 11 takes place which, however, in its effect can be regarded as a continuous movement. The drive for the accelerated return of the threaded spindles 14 and 15 after completion of the winding process is initiated, if the winding type offers such, after finishing of the winding body, according to program in such a way that at first all the control and adjusting means active up to this moment are switched off or switched over, respectively, the turning direction of motor 18 is reversed by pole-reversal taking place in the electrical control part and the switching coupling 19, 21 of the double coupling is switched on which, for the increase of the return speed, is connected over a transmission countershaft 40 with the drive shaft of gear 22. The return of the limit switches 10 and 11 from their program end position to their starting position for the next winding operation runs now, in contrast to their displacement during the winding build-up, without interruptions and considerably faster.

As impulse-producers for the switching of the coupling 19, 20 there serves in the example represented according to the invention a light barrier 41 operating without contact, with a light source 42 and a photoelectric cell 43, working together with a switching disc 44. The drive of the switching disc 44 takes place at a constant turning rate of motor 18, over the gear wheels 45, 46, 47, 48 to the shaft 49 carrying the switching disc 44. According to FIG. 3, the switching disc 44 carries on its circumference switching tongues (switching segments) 50, which interrupt the light beam from light source 42 striking the photoelectric cell 43, depending on their width, for a greater or lesser period of time. For the duration of the interruption of the light beam the coupling 19, 20 is in each case switched on, and in this manner the rotary movement of the motor 18 is transmitted to the threaded spindles 14 and 15. As long as switching disc 44 is in rotation an engagement of the coupling takes place at each turn (360°) for only a fraction of the turn, i.e., as soon as the tongue of the rotating disc disengages the impulse-producing means. The time of the coupling being engaged in relation to the time of the coupling being disengaged is proportional to the sum of the tongue or window widths in relation to the circumference of disc 44. This ratio is retained whether the turning rate of disc 44 is changed or not. The turns completed per time unit of the threaded spindles 14 and 15 result then from the turning rate of the motor 18, the transmission ratio set between motor 18 and threaded spindles 14 and, in the above engagement time of coupling 19, 20 per time unit determined by the circumferential relation on the switching disc 44. By change of the motor turning rate, for example by pole-reversal, the speed of the threaded spindles can be varied without changing the circumferential ratio between interrupted and uninterrupted light path. In order to accelerate the movement of limit switches 10 and 11, that is, the turns of the threaded spindles 14 and 15 over the whole course of the winding buildup at a constant motor turning rate, the proportion of the light beam interruption at the circumferential length from turn to turn of the switching disc 44 has to become greater. For this purpose the switching disc 51 (FIG. 4) is used with switching tongues 52 whose width increases toward the disc pivot point. The light barrier 41 is caused to move, with progressing winding buildup, in uniform movement radially toward the center of the switching disc 44, whereby the light beam incident upon the photoelectric cell 43 is interrupted for an increasingly long time as the width of the switching tongues 52 increases. The drive for the displacement of the light barrier 41 is accomplished from the curve plate (cam plate) 38 over the rod system 53 to the swinging wedge 54, which turns on the swinging axis 55. Under the pull of spring 56, the light barrier 41 with its bearing pin 57 remains in constant contact with the swinging wedge 54. The form of the curve 38 is determinative for the measure and the time point of the acceleration of the limit switches 10 and 11 and thereby for the influencing of the stroke displacement of the ring bench 6. The superimposition of the two control possibilities (change of the switching tongue width and of the motor turning rate) makes possible an altogether comprehensive program formation. In a winding type for which the shifting of the light barrier 41 is undesired, this device is disengaged by turning the rod 53 to a slight degree on its own axis, lifting it off from the curve (cam) plate 38 and arresting it by means of a holding device (not represented).

In FIG. 5 there is represented a switching disc consisting of individual discs 58 and 59, whose effective tongue width can be altered by turning discs 58, 59 against each other (see also FIG. 6).

As impulse-producing means for the displacing mechanism of the control and switching device in a mechanically or hydraulically driven traverse system there are arranged, according to the invention, light barriers 41 and 41' consisting of the light sources 42 and 42' and the photoelectric cells 43 and 43', which interact in common with switching disc or plate 44. Switching disc 44 is driven, preferably at a constant rate, by rotating axle 49. The switching disc 44 carries on its circumference switching tongues or segments 50 and 50', which interrupt the light beam striking the photoelectric cells 43 and 43' respectively, according to their width, for a greater or shorter time. If the light barriers are mounted at differing distances from the rotation axis of the switching disc, only the light source of one of the two light barriers is switched on and, correspondingly, only the photoelectric cell belonging to it is active as an impulse-giver. For the alternate switching on and off, the light barriers 41 and 41' are connected by multilead lines 62 and 63 to a change-over switch 64, which is connected by cable 65 to special control switches (not shown). These control switches may, in a particular case, serve simultaneously as blocking switches on the displacement path of the end switches 10 and 11 according to FIG. 1 of my copending application and be operated by the latter. Impulses coming from the light barriers 41 and 41' are passed on (retransmitted) over the connection 66 to an amplifier relay (not shown). In order to provide a means for shifting light barriers 41 and/or 41', the barriers can be mounted as shown on a common slide 61 having a control-cam-type "lay-on" prong 57. A swinging key or wedge 54, rotatable about swinging axis 55, which can be operated by a cam plate (not shown) over the rod (system) 53 serves to move the barriers in a preselected manner. The degree of swinging determines the immersion depth of the switching disc into the light barriers 41 and 41' and thereby influences the ring rail displacement.

The measures represented for a light barrier impulse-giver can be used analogously also on control and switching devices in mechanically or hydraulically driven traverse systems in which an electromagnetic impulse-giver is provided with a rotating switching disc altering the induced magnetic flux. Likewise, it is possible, too, to arrange both types of impulse-givers in common in a control device.

According to the control and switching device described in my copending application, it is entirely possible to cause sections of the stroke diminution to alternate with those of the stroke enlargement according to the program. For this purpose it is only necessary to reverse the turning direction of the threaded spindles by changing the turning direction of the drive motor. In many cases, however, it has proved advantageous to choose the degree of stroke diminution differently from that of the stroke enlargement in the time unit. This is achieved according to the present invention by having the two light barriers arranged at differing distances from the axis of rotation of the switching disc or plate belonging to them in common, and the light beam of the light barrier lying closest to the axis of rotation is interrupted correspondingly longer by a wider switching tongue than the light beam of the other light barrier, which is interrupted by a narrower switching tongue for a shorter time. During the section of the stroke shortening, only one of the two light barriers acts on the amplifier relay and during the stroke lengthening only the other acts thereon, and, thereby, for example, over switch couplings, on the threaded spindles and also on the end switches to be displaced by the switch coupling. The variety of the winding forms producible by means of this device undergoes, through this additional measure, even an additional advantageous enrichment.

Obviously many modifications and variations of the invention as hereinbefore set forth may be made without departing from the spirit and scope thereof, and therefore only such limitations should be imposed as are indicated in the appended claims.

I claim:

1. Control means for controlling the stroke of the traverse mechanism of spinning, winding, and ring twist machines which comprises: rotatable displacing members, stroke limiting switches mounted on said displacing members, drive means for said displacing members and at least two impulse-producing means for controlling said drive means, said impulse-producing means including at least two energy sources and at least one rotating member capable of periodically interrupting energy from said source.

2. Control means for controlling the stroke of the traverse mechanism of spinning, winding, and ring twist machines which comprises: rotatable displacing members, stroke limiting switches mounted on said displacing members, drive means for said displacing members and at least two impulse-producing means for controlling said drive means, said impulse-producing means including at least two energy sources and a rotating member for each of said impulse-producing means capable of periodically interrupting energy from said source.

3. Control means as in claim 1 wherein said rotating member is a disc provided with switching tongues.

4. Control means as in claim 2 wherein the impulse-producing means are arranged at different distances from the axis of the rotating disc.

5. Control means as in claim 1 which include means for moving said impulse-producing means toward or away from the circumference of the rotating member.

6. Control means as in claim 2 which includes additional means for engaging only one of the impulse-producing means for delivering switching impulses.

7. Control means as in claim 5 which includes additional means for switching off an impulse-producing means and simultaneously switching on another impulse-producing means.

References Cited

UNITED STATES PATENTS 2,994,000   7/1961   Schoppelrey -------- 250—233

ROBERT SEGAL, *Primary Examiner.*

V. LAFRANCHI, *Assistant Examiner.*